US009000382B2

(12) United States Patent
Mattson et al.

(10) Patent No.: US 9,000,382 B2
(45) Date of Patent: Apr. 7, 2015

(54) SPECTRAL IMAGING DETECTOR

(75) Inventors: Rodney A. Mattson, Mentor, OH (US); Randall P. Luhta, Highland Heights, OH (US); Marc A. Chappo, Elyria, OH (US)

(73) Assignee: Koninklijke Philips N.V., Eindhoven (NL)

( * ) Notice: Subject to any disclaimer, the term of this patent is extended or adjusted under 35 U.S.C. 154(b) by 300 days.

(21) Appl. No.: 13/128,883

(22) PCT Filed: Oct. 29, 2009

(86) PCT No.: PCT/IB2009/054818
§ 371 (c)(1),
(2), (4) Date: May 12, 2011

(87) PCT Pub. No.: WO2010/058309
PCT Pub. Date: May 27, 2010

(65) Prior Publication Data
US 2011/0210256 A1  Sep. 1, 2011

Related U.S. Application Data

(60) Provisional application No. 61/115,560, filed on Nov. 18, 2008, provisional application No. 61/176,224, filed on May 7, 2009.

(51) Int. Cl.
*G01T 1/20* (2006.01)
*G01T 1/00* (2006.01)

(52) U.S. Cl.
CPC .................. *G01T 1/00* (2013.01); *G01T 1/2018* (2013.01)

(58) Field of Classification Search
USPC ..................................................... 250/363.01
See application file for complete search history.

(56) References Cited

U.S. PATENT DOCUMENTS

| 4,542,519 | A | | 9/1985 | Sugimoto |
| 5,440,129 | A | | 8/1995 | Schmidt |
| 6,114,685 | A | | 9/2000 | Sato et al. |
| 6,114,703 | A | * | 9/2000 | Levin et al. ................... 250/367 |
| 6,181,773 | B1 | * | 1/2001 | Lee et al. ....................... 378/155 |
| 6,426,991 | B1 | | 7/2002 | Mattson et al. |
| 7,399,972 | B2 | | 7/2008 | Yanada et al. |
| 7,573,035 | B2 | | 8/2009 | Levene et al. |
| 7,635,848 | B2 | * | 12/2009 | Nelson ..................... 250/370.11 |
| 8,324,581 | B2 | * | 12/2012 | Danzer et al. ................. 250/367 |
| 2002/0110216 | A1 | | 8/2002 | Saito et al. |
| 2004/0071258 | A1 | * | 4/2004 | Okumura et al. ............... 378/19 |
| 2005/0061985 | A1 | * | 3/2005 | Hoffman .................. 250/370.01 |

(Continued)

FOREIGN PATENT DOCUMENTS

| WO | 03008999 A2 | 1/2003 |
| WO | WO 2006114716 A2 * | 11/2006 |
| WO | WO 2007039840 A2 * | 4/2007 |

*Primary Examiner* — Christine Sung

(57) ABSTRACT

A one-dimensional multi-element photo detector (120) includes a photodiode array (122) with a first upper row of photodiode pixels and a second lower row of photodiode pixels. The photodiode array (122) is part of the photo detector (120). A scintillator array (126) includes a first upper row and a second lower row of scintillator pixels. The first upper and second lower rows of scintillator pixels are respectively optically coupled to the first upper and second lower rows of photodiode pixels. The photo detector (120) also includes readout electronics (124), which are also part of the photo detector (120). Electrical traces (512) interconnect the photodiode pixels and the readout electronics (124).

36 Claims, 12 Drawing Sheets

(56) References Cited

U.S. PATENT DOCUMENTS

| | | |
|---|---|---|
| 2006/0186341 A1 | 8/2006 | Ueno et al. |
| 2007/0096031 A1* | 5/2007 | Meier et al. .............. 250/370.11 |
| 2008/0210877 A1 | 9/2008 | Altman et al. |
| 2008/0253507 A1 | 10/2008 | Levene et al. |
| 2010/0014631 A1 | 1/2010 | Sonsky et al. |
| 2010/0270462 A1* | 10/2010 | Nelson et al. .............. 250/252.1 |

* cited by examiner

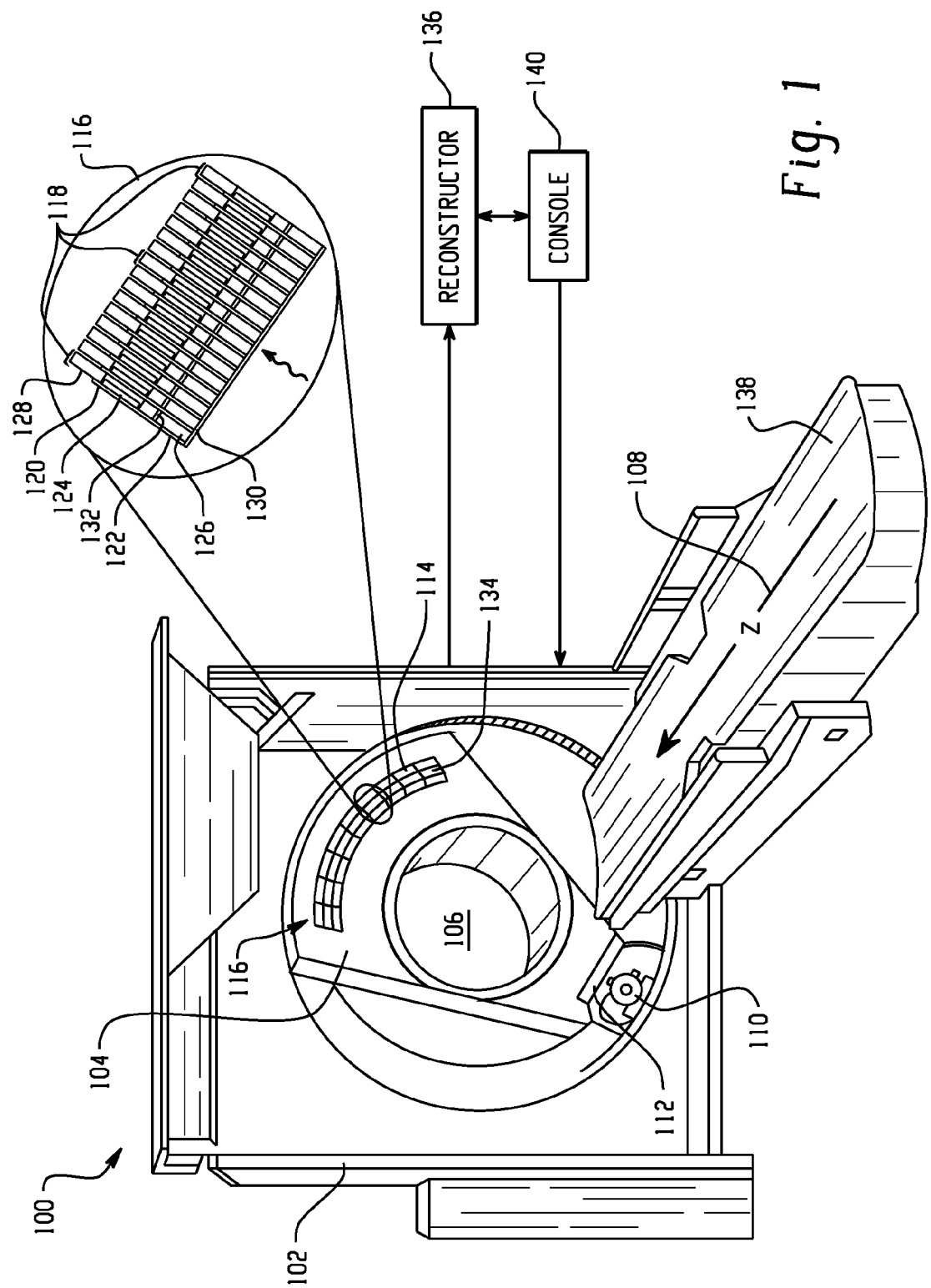

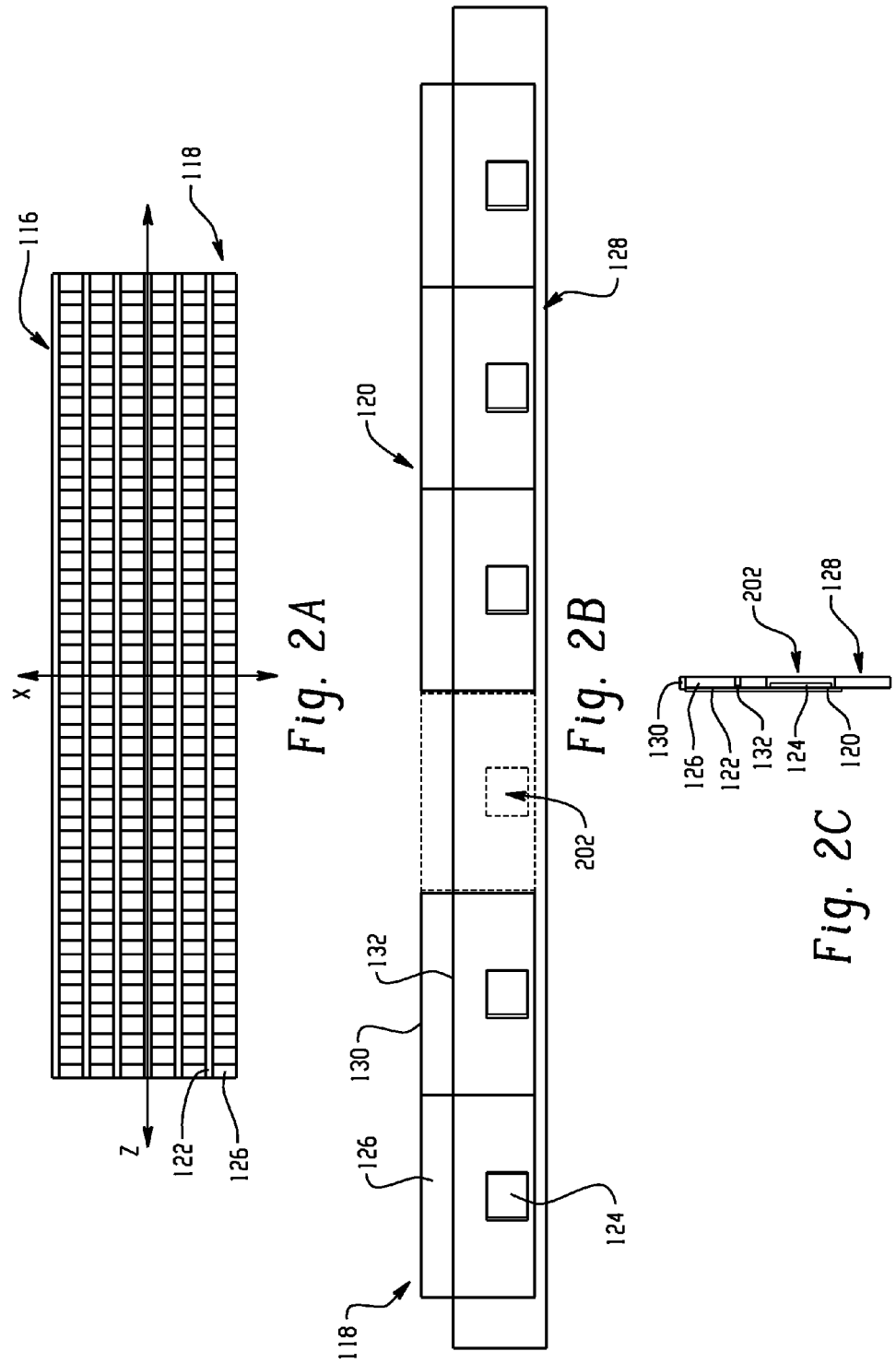

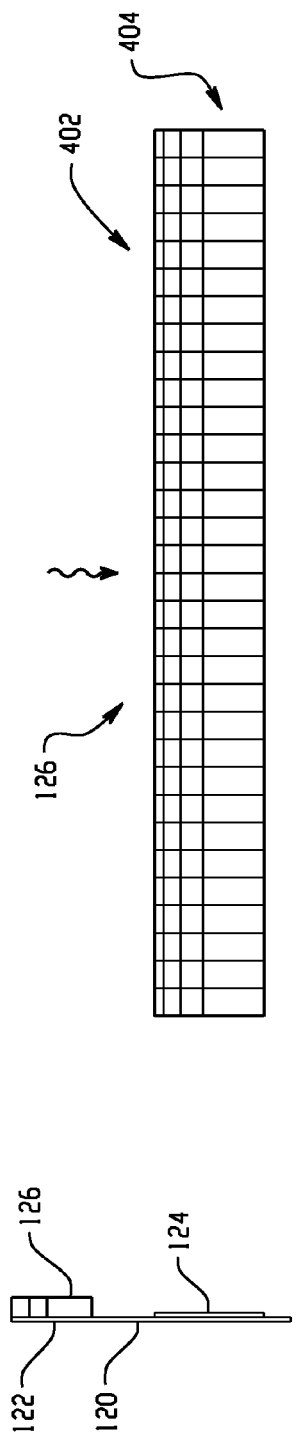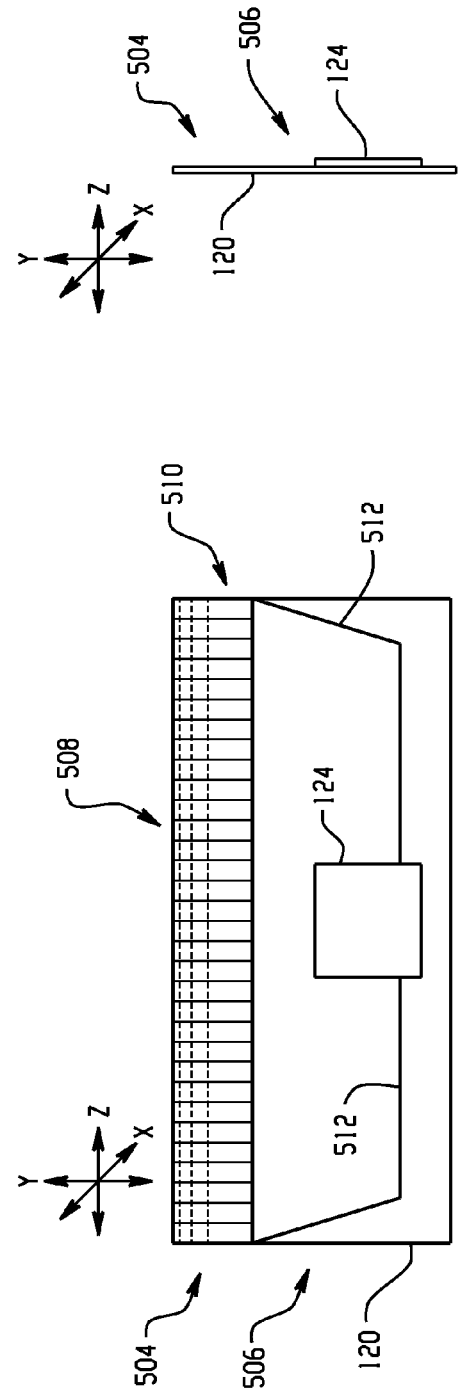

SPECTRAL IMAGING DETECTOR

CROSS REFERENCE TO RELATED APPLICATIONS

This application claims the benefit of U.S. provisional application Ser. No. 61/115,560 filed Nov. 18, 2008 and U.S. provisional application Ser. No. 61/176,224 filed May 7, 2009, both of which are incorporated herein by reference.

The following generally relates to a spectral imaging detector. Although it is described herein in connection with computer tomography (CT), it is also amenable to other medical and non-medical imaging applications.

A computed tomography (CT) scanner generally includes an x-ray tube mounted on a rotatable gantry opposite a detector array including one or more rows of detector pixels. The x-ray tube rotates around an examination region located between the x-ray tube and the detector array, and emits polychromatic radiation that traverses the examination region and an object or subject disposed therein. The detector array detects radiation that traverses the examination region and generates a signal or projection data indicative of the examination region and the object or subject disposed therein.

A reconstructor processes the projection data and generates volumetric image data indicative of the examination region and the object or subject disposed therein. The volumetric image data can be processed to generate one or more images that include the scanned portion of the object or subject. The resulting image(s) includes pixels that typically are represented in terms of gray scale values corresponding to relative radiodensity. Such information reflects the attenuation characteristics of the scanned subject and/or object, and generally shows structure such as anatomical structures within a patient, physical structures within an inanimate object, and the like.

The detected radiation also includes spectral information as the absorption of the radiation by the subject and/or object is dependent on the energy of the photons traversing therethrough. Such spectral information can provide additional information such as information indicative of the elemental or material composition (e.g., atomic number) of the tissue and/or material of the subject and/or object. However, with conventional CT the projection data does not reflect the spectral characteristics as the signal output by the detector array is proportional to the energy fluence integrated over the energy spectrum.

In spectral CT, the spectral information is leveraged to provide further information such as information indicative of elemental or material composition. One technique for obtaining spectral information is to use a double-decker detector. Such a detector generally includes a circuit board with a side-mounted photosensor array bounded thereto. The photosensor array includes upper and lower rows of pixels, which are respectively offset from each other in the direction of the incoming radiation. A scintillator array, having corresponding upper and lower row of pixels that are offset from each other in the direction of the incoming radiation, are bounded to the photosensor array. The photosensor and scintillator arrays are coupled together so that a scintillator pixel in a row is optically coupled to a corresponding photosensor pixel in a corresponding row.

As noted above, absorption of radiation is dependent on photon energy. That is, lower energy photons will travel a shorter distance or lesser depth in the scintillator array before being absorbed, relative to higher energy photons, which will travel further through the scintillator before being absorbed at a greater depth. As such, lower energy photons are absorbed in upper scintillator row and higher energy photons, which traverse through the upper scintillation row, are absorbed in the lower scintillation row. Energy separation can be further improved by disposing a filter in between the two rows.

Unfortunately, the signals generated by the photosensor array have to be routed to the circuit board and, from there, to the processing electronics, which often reside off the circuit board. As such, a high density of interconnects, which may increase noise and/or otherwise degrade the signals transferred off the detector, has to be used. As a result, the footprint may be relatively large and increase the overall cost of the detector.

Aspects of the present application address the above-referenced matters and others.

In one aspect, a one-dimensional multi-element photo detector includes a photodiode array with a first upper row of photodiode pixels and a second lower row of photodiode pixels. The photodiode array is part of the photo detector. A scintillator array includes a first upper row and a second lower row of scintillator pixels. The first upper and second lower rows of scintillator pixels are respectively optically coupled to the first upper and second lower rows of photodiode pixels. The photo detector also includes readout electronics, which are also part of the photo detector. Electrical traces interconnect the photodiode pixels and the readout electronics.

In another aspect, a detector module includes a plurality of slice modules. Each slice module includes a plurality of support structures and a plurality of one-dimensional multi-element photo detectors. Each of the plurality of support structures supports a corresponding one of the one-dimensional multi-element photo detectors. Each one-dimensional multi-element photo detector includes a readout area with readout electronics and a photosensitive area with a photo diode array having a plurality of stacked rows of photodiode pixels. A scintillator array is optically coupled to the photo diode array.

In another aspect, an imaging system includes a source that emits radiation from a focal spot and a detector array that detects the radiation and generates a signal indicative thereof. The detector array includes a plurality of slice modules stacked along a transverse axis and extending along a longitudinal axis. Each slice module includes a plurality of one-dimensional multi-element photo detectors aligned in series. Each one-dimensional multi-element photo detector includes readout electronics and a photo diode array with at least a first upper row and a second lower row of photodiode pixels. A scintillator array has at least a first upper row and a second lower row of scintillator pixels. The first upper and second lower rows of scintillator pixels are respectively optically coupled to the first upper and second lower rows of photodiode pixels. A plurality of support structures, each support structure supporting a corresponding one of the photo detectors.

The invention may take form in various components and arrangements of components, and in various steps and arrangements of steps. The drawings are only for purposes of illustrating the preferred embodiments and are not to be construed as limiting the invention.

FIG. 1 illustrates an example imaging system.

FIG. 2(A) illustrates a top down view of a detector module of a detector array of the imaging system.

FIGS. 2(B) and (C) illustrate an example slice module and a plurality of one dimensional detector modules affixed thereto.

FIG. 3 illustrates a side view of an example one dimensional detector module.

FIG. 4 illustrates a front view of an example scintillator array.

FIGS. 5(A) and (B) illustrate a front view of an example one dimensional detector module, without the scintillator array affixed thereto.

Figure 6:
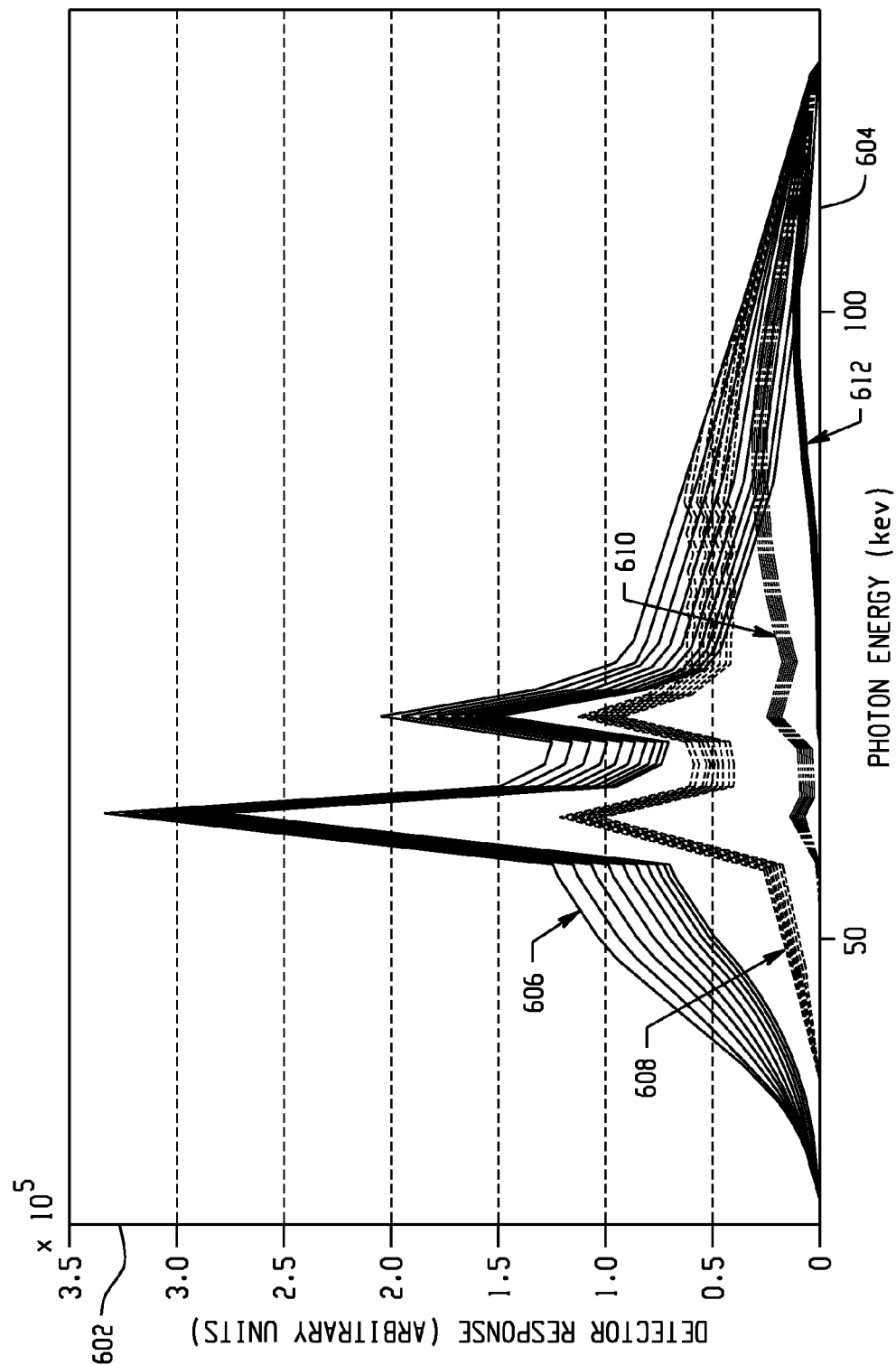

FIG. 6 illustrates an example detector response, as a function of scintillator pixel depth and photon energy.

Figure 7:
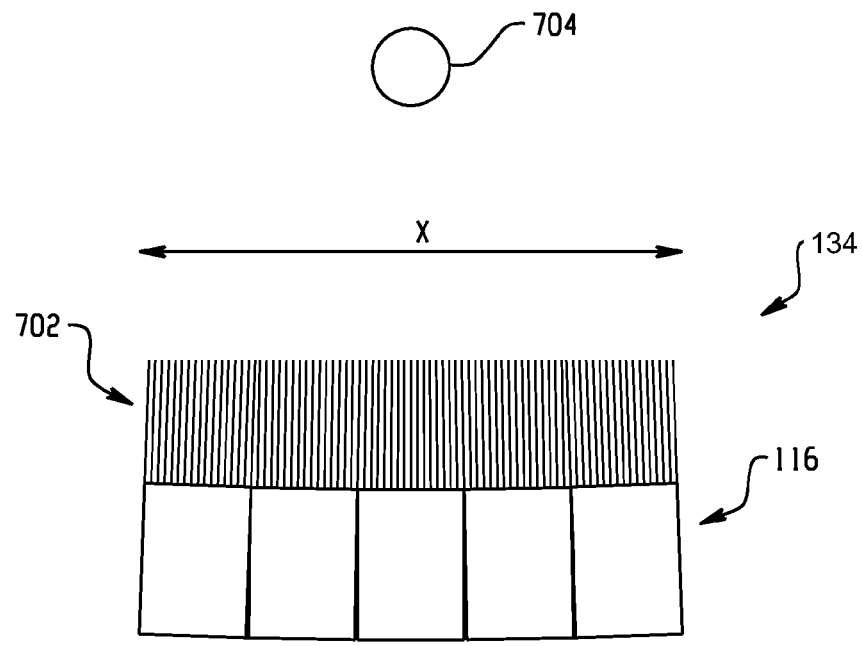

FIG. 7 illustrates an anti-scatter grid with septa focused along the x-axis.

Figure 8:
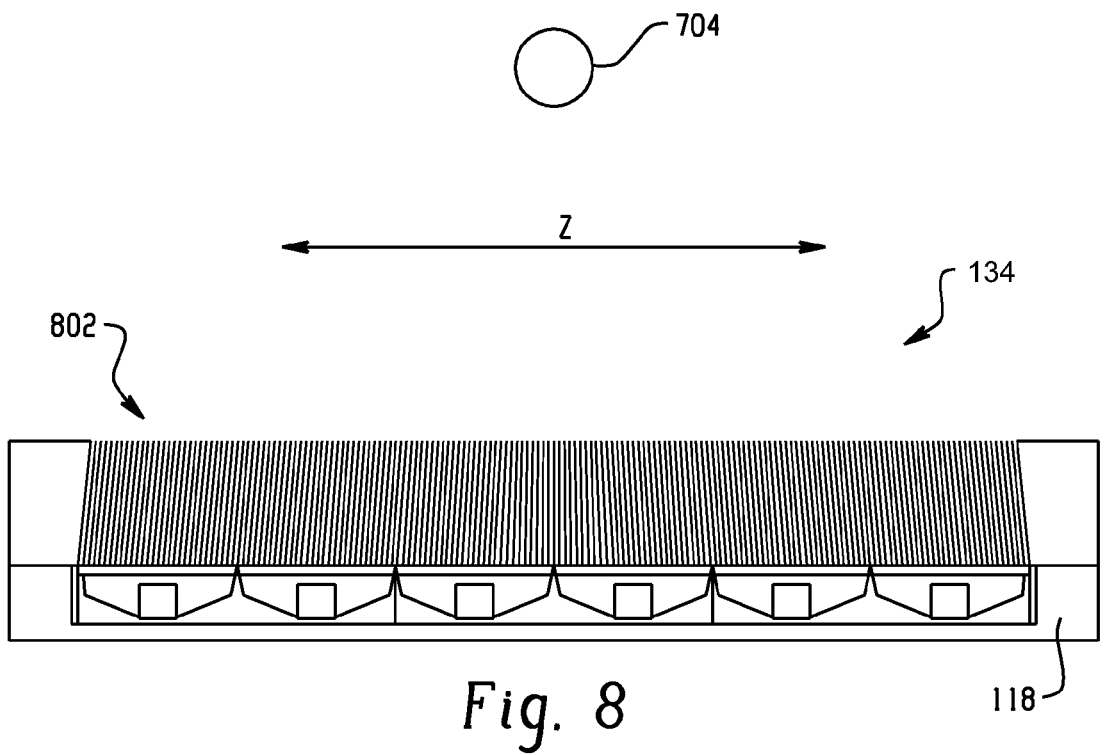

FIG. 8 illustrates an anti-scatter grid with septa focused along the z-axis.

Figure 9:
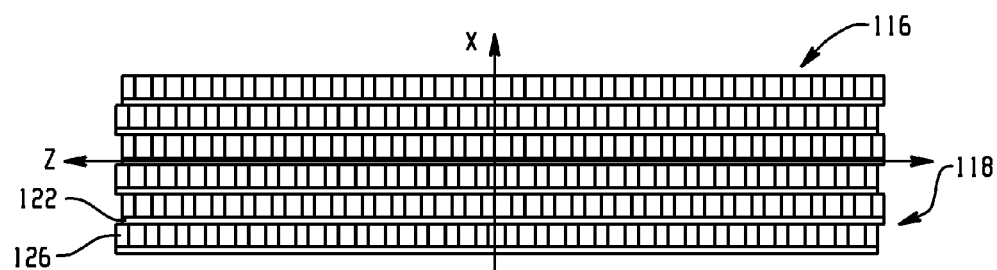

FIG. 9 illustrates a top down view of an example detector module having alternately staggered slice modules.

Figure 10:
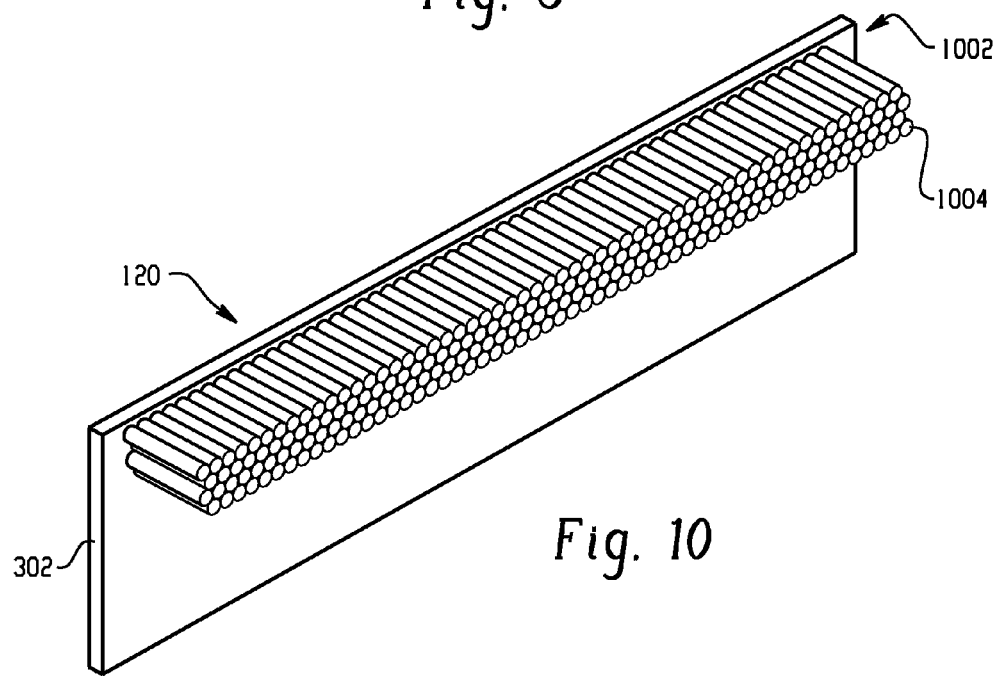

FIG. 10 illustrates an example one dimensional detector module with a columnar scintillator array affixed thereto.

Figure 11:
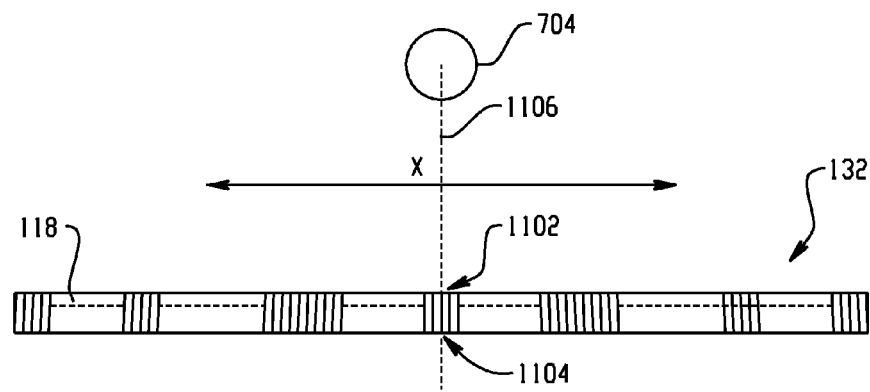

FIG. 11 illustrates an example detector array, which includes a plurality of slice modules that are focused at the focal spot.

Figure 12:
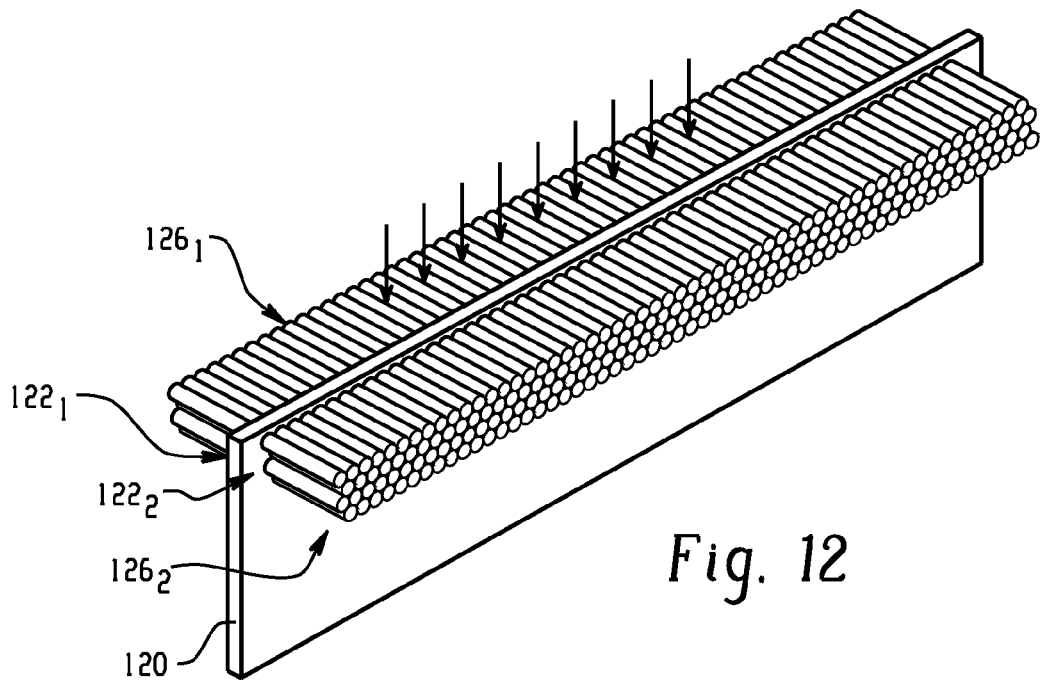

FIG. 12 illustrates an example double-sided multi-element photo detector.

Figure 13:
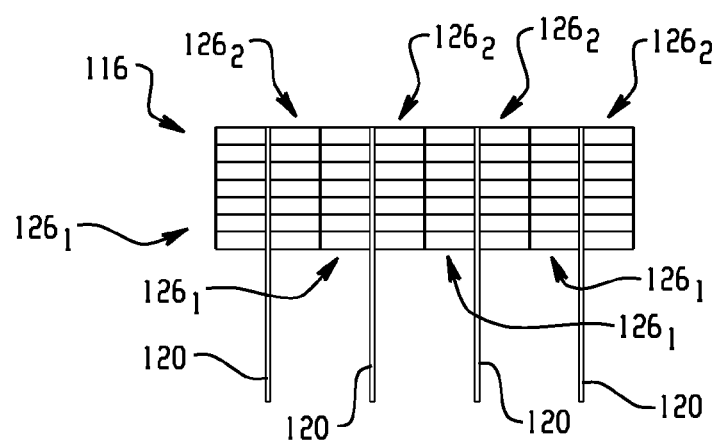

FIG. 13 illustrates an example detector module that includes a plurality of stacked double-sided multi-element photo detectors.

Figure 14:
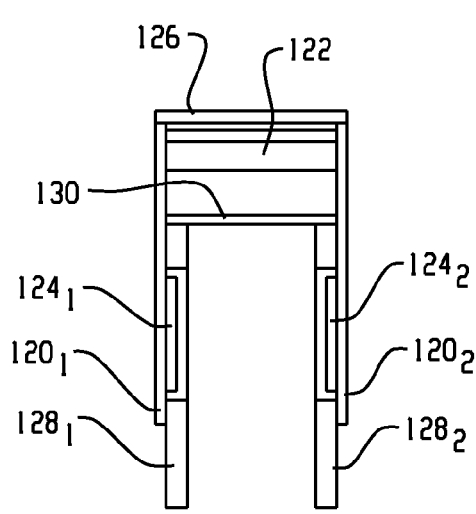

FIG. 14 illustrates an example pair of multi-element photo detectors sharing a common scintillator array.

Figure 15:
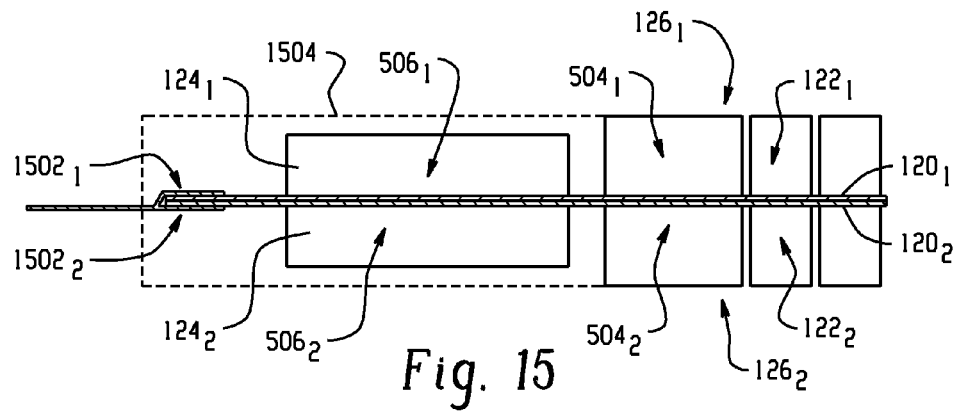
Figure 16:
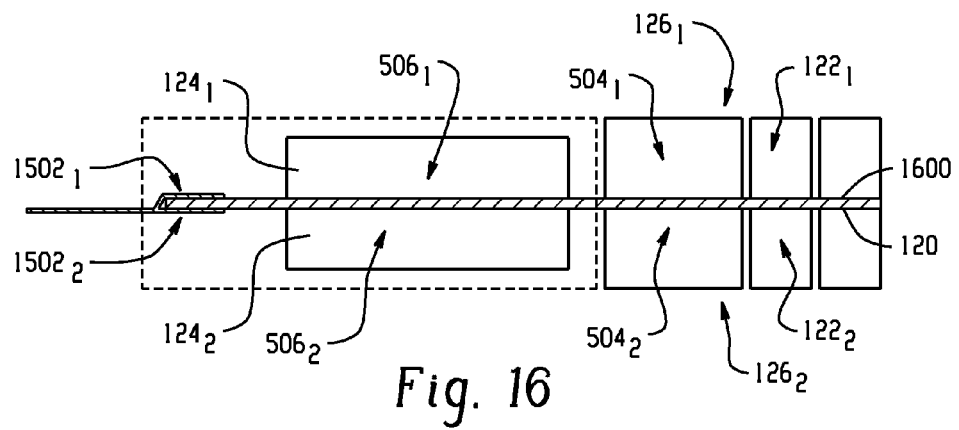
Figure 17:
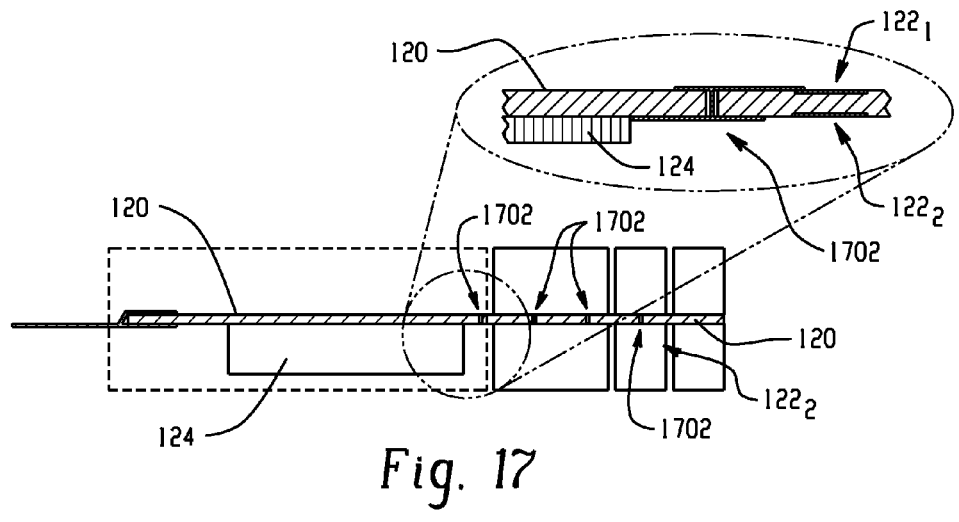

FIGS. 15, 16 and 17 illustrate various non-limiting embodiments of a double-sided one-dimensional multi-element photo detector.

Figure 18:
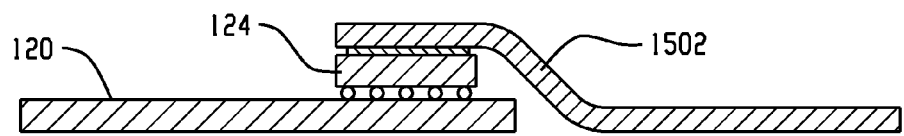

FIG. 18 illustrates an example connection between an I/O contact and the readout electronics.

FIGS. 19, 20, 21 and 22 illustrate a non-limiting example method for assembling a double-sided single ASIC one-dimensional multi-element photo detector.

Figure 23:
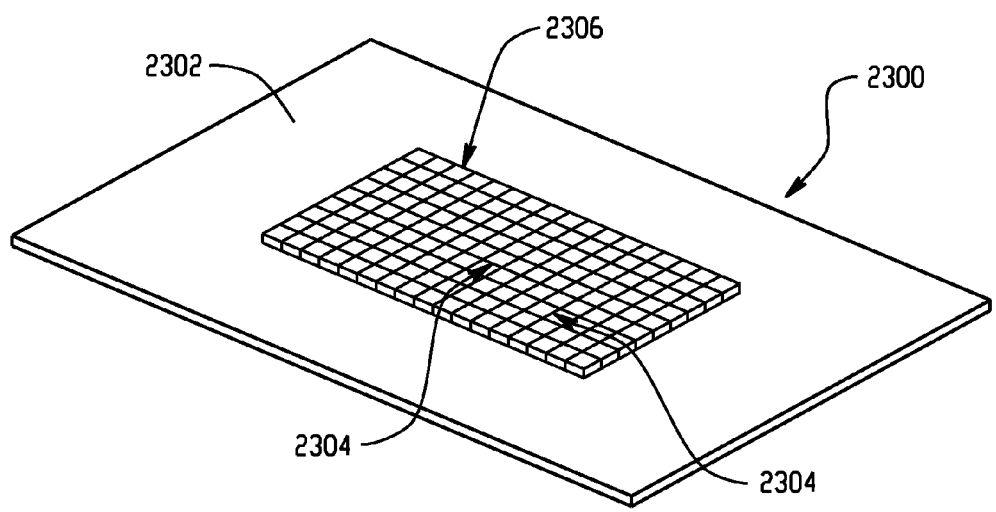
Figure 24:
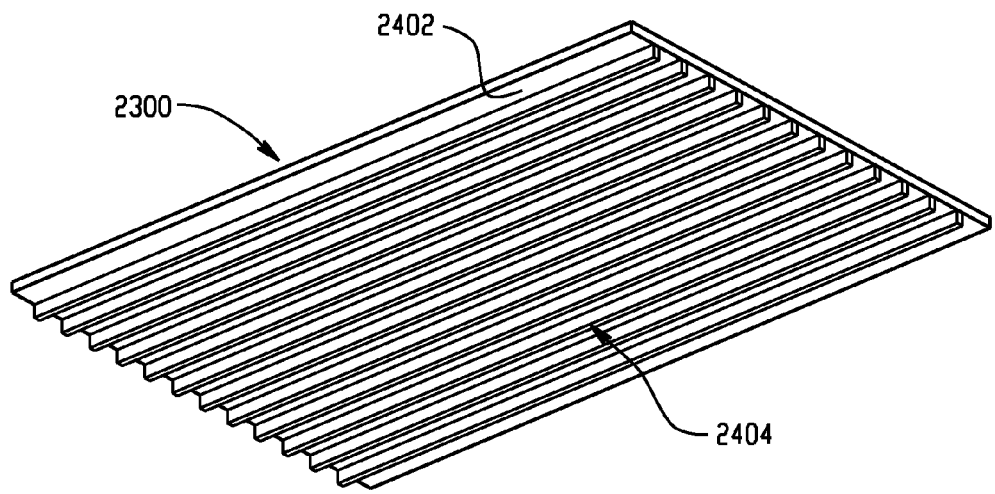

FIGS. 23 and 24 show an example alignment plate.

Figure 25:
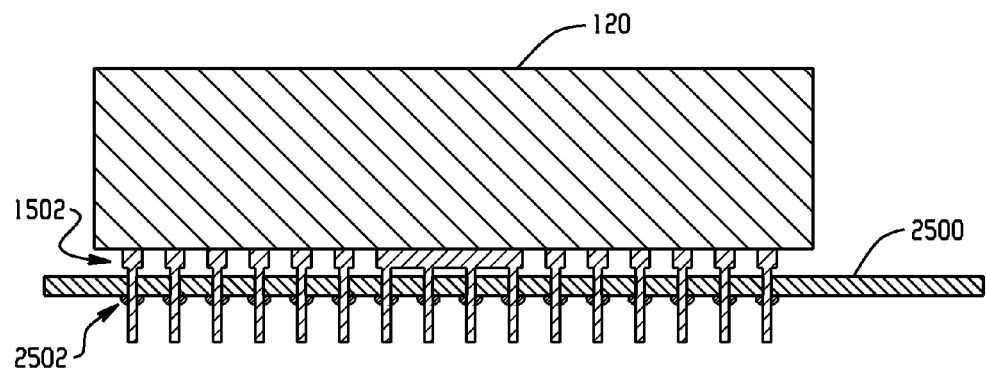
Figure 26:
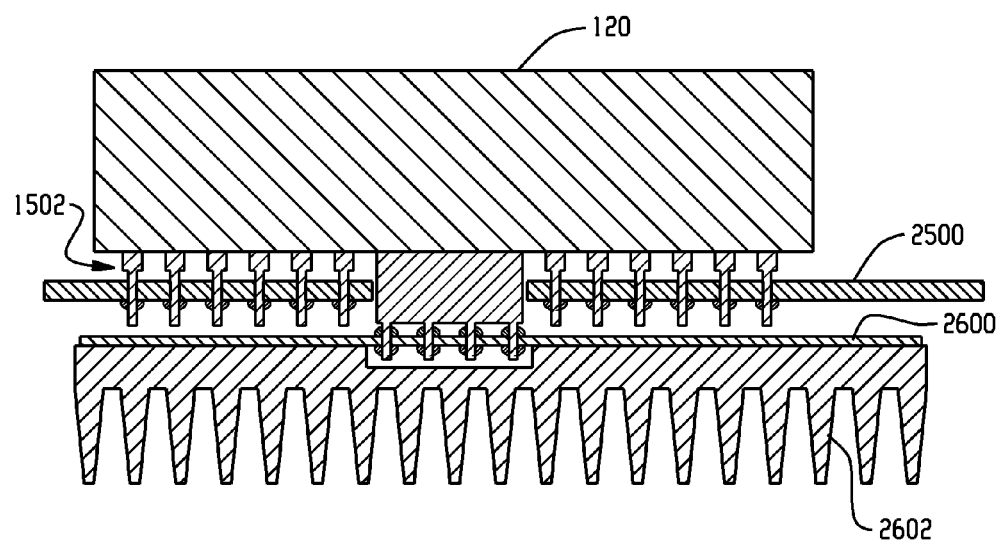

FIGS. 25 and 26 show non-limiting embodiments of a photo detector mounted to a printed circuit board.

The following generally relates to a two-dimensional detector array formed from several stacked one-dimensional slice modules, wherein a slice module includes a plurality of one-dimensional multi-element photo detectors, and a one-dimensional multi-element photo detector includes both a photodiode area (with a multi-dimensional photodiode array thereon) and a readout area (with readout electronics thereon). In one instance, having both the photodiode area and the readout area part of the same substrate, the overall cost, interconnect density and footprint of the detector array may decrease and the reliability and dose efficiency of the detector array may increase, at least relative to detector configurations in which the photodiode array is mounted to a separate circuit board that carries the readout electronics. Spectral information can be derived from measuring the x-ray absorption along the depth direction of the scintillator array, and conventional CT measurements can be derived by summing outputs from detectors in the same ray path.

Initially referring to FIG. 1, an imaging system or CT scanner 100 is illustrated. The scanner 100 includes a stationary gantry 102 and a rotating gantry 104, which is rotatably supported by the stationary gantry 102. The rotating gantry 104 rotates around an examination region 106 about a longitudinal or z-axis 108.

A radiation source 110, such as an x-ray tube, is supported by and rotates with the rotating gantry 104, and emits radiation. A source collimator 112 collimates the emitted radiation to form a generally cone, fan, wedge, or otherwise shaped radiation beam that traverses the examination region 106.

A radiation sensitive detector array 114 is affixed to the rotating gantry 104 and subtends an angular arc, across from the radiation source 110, opposite the examination region 106. The illustrated detector array 114 includes a plurality of detector modules 116 stacked along a transverse or x-axis. As shown, a detector module 116 includes a plurality of slice-modules 118 stacked along the x-axis direction.

As described in greater detail below, a slice module 118 extends along the z-axis direction and includes at least one one-dimensional multi-element photo detector 120 affixed to a support structure 128. A one-dimensional multi-element photo detector 120 includes a photodiode area with a multi-element photodiode array 122 and a two-dimensional scintillator array 126 optically coupled to the photodiode array 122, and a readout area with readout electronics 124 such as an integrated circuit, an application specific integrated circuit (ASIC), or the like. As noted above, the one-dimensional multi-element photo detector 120 is configured so as to include both the photodiode array 122 and the readout electronics 124. In one instance, this can be thought of as extending the photodiode array 122 to include a non-photosensitive area and incorporating the readout electronics 124 on that extended area of the photodiode array 122.

The one-dimensional multi-element photo detector 120 also includes top and bottom seals 130, 132. The top seal 130 is coupled to the side of the scintillator 126 facing the incoming radiation. The bottom seal 132 is coupled to an opposing side of the scintillator 126. One or both of the seals 130, 132 may include a reflective material such as a paint, film or other coating, which may improve efficiency relative to a configuration in which the seals 130, 132 do not include the reflective material, as the reflective material re-directs photons traversing away from the photodiode array 122 towards the photodiode array 122.

The detector array 114 detects photons emitted by the radiation source 110 that traverse the examination region 106 and generates a signal or projection data indicative of the detected radiation. Spectral information can be derived from measuring the x-ray absorption along the depth of the scintillator array 126, and conventional CT measurements can be made by summing the outputs of the elements of the multi-element photodiode array 122 in the same ray path.

An anti-scatter grid 134 is disposed between the detector array 114 and incoming radiation. The illustrated anti-scatter grid 134 is a one piece anti-scatter grid that includes a plurality of channels that allow transmission radiation to pass through to the scintillator array 126 while inhibiting a substantial amount of scatter radiation from reaching the scintillator array 126. The individual channels of the anti-scatter grid 134 can be focused in one or two dimensions at the focal spot as discussed in greater detail below. A multiple piece anti-scatter grid is also contemplated herein.

A reconstructor 136 reconstructs the signal or projection data using a spectral or conventional reconstruction algorithm, and generates volumetric image data indicative of the examination region 106. One or more spectral or conventional images can be generated from the volumetric image data.

A support 138, such as a couch, supports the object or subject in the examination region 106. The support 138 is movable along the z-axis in coordination with the rotation of the rotating gantry 104 to facilitate helical, axial, or other desired scanning trajectories.

A general purpose computing system serves as an operator console 140, which includes human readable output devices such as a display and/or printer and input devices such as a keyboard and/or mouse. Software resident on the console 140 allows the operator to control the operation of the system 100, for example, by allowing the operator to select a spectral or conventional scan protocol, initiate/terminate scanning, view and/or manipulate the volumetric image data, and/or otherwise interact with the system 100.

The detector module 116 is further described in connection with FIGS. 2-5.

Initially referring to FIG. 2(A), a top-down view of the detector module 116 is illustrated. As shown, the individual slice modules 118 extend along the z-axis substantially aligned and in parallel with respect to each other. The slice modules 118 are aligned such that multi-element photodiode arrays 122 and scintillator arrays 126, on adjacent one-dimensional multi-element photo detectors 120, are in substantial alignment along the x-axis. An example detector module 116 may include 1 to 256 slices modules 118, such as 8, 16, 24, 32, etc. slice modules.

FIG. 2(B) illustrates a front view of an example slice module 118. In this example, multiple one-dimensional multi-element photo detectors 120 are sequentially or consecutively affixed to or installed on the support structure 128 along the z-axis direction. The support structure 128 includes a plurality of thru holes or material free regions 202. In one instance, the support structure 128 includes a material that matches the coefficient of thermal expansion of the one dimensional multi-element photo detectors 120.

A one-dimensional multi-element photo detector 120 couples or affixes to a back side of the support structure 128 via the non-photosensitive section, and the corresponding readout electronics 124 in the non-photosensitive section extends into a respective material free region 202. For clarity purposes, FIG. 2(C) shows a cross sectional view of the slice module 118 of FIG. 2(B). The non-photosensitive section of the one-dimensional multi-element photo detector 120 can be adhesively bonded to the support structure 128.

FIGS. 3-6 illustrate an example one-dimensional multi-element photo detector 120.

FIG. 3 shows a side view of the one-dimensional multi-element photo detector 120 with the scintillator array 126 attached thereto. In this example, the scintillator array 126 is a structured scintillator array that includes a plurality or rows of scintillator pixels. Four rows are shown for explanatory purposes; however, more or less rows are also contemplated. As described in greater detail below, the scintillator pixels are structured in that their shape, e.g., their depth, influences the energy separation and x-ray statistics.

The structured pixels of the scintillator array 126 are affixed to the photodiode array 122 such that individual pixels of the scintillator array 126 are substantially aligned with and optically coupled to individual pixels of the photodiode array 122. A reflective material such as paint, a film, a coating or the like can be placed on one or more sides of the sides of the scintillator pixels not affixed to the photodiode array 122. This may improve detection efficiency relative to a configuration in which the reflective material is not employed, as light moving in a direction away from the photodiode array 122 is re-directed towards the photodiode array 122. As shown, the scintillator array 126 extends out in the x-axis direction farther than the readout electronics 124, thereby inhibiting x-rays from striking and damaging the readout electronics 124.

FIG. 4 illustrates an example structured scintillator array 126 for the one-dimensional multi-element photo detector 120 shown in FIG. 3. In this example, the scintillator includes M columns 402×N rows 404 of scintillator pixels, where M and N correspond to the number of photodiode pixels in the pixilated area (FIG. 5 below), and forms a scintillator pixel array 126. Again, four rows are only shown for explanatory purposes and do not limit the invention. The pixels can be formed for various materials or emitters such as cesium iodide (CsI), zinc selenide (ZnSe), zinc selenide doped with tellurium (ZnSe:Te), cadmium tungstate ($CdWO_4$ or CWO), gadolinium oxy sulfide (GOS) and/or other suitable emitters.

In the illustrated embodiment, the pixels are structure and generally polyhedron shaped such as cuboid shaped, with a length or depth that increases with each row 404 in a direction moving away from the incoming radiation. By way of example, respective depths can vary from 0.1 mm to 10 mm. For example, in one instance the depth of the pixels respectively can be 0.35 mm, 0.65 mm, 1.00 mm and 2.50 mm. More generally, the image reconstruction process requirements may determine suitable thicknesses, and hence relative absorption, of the scintillator rows.

Varying the depth of rows of scintillators may facilitate balancing or equalizing the number of x-ray absorptions in each row as the number of x-rays traversing each row decreases as x-rays are absorbed in previous rows. Additionally or alternatively, varying the emitter material from row to row may facilitate balancing or equalizing the number of x-ray absorptions in each row. Generally, the geometry and/or materials of the rows are selected so that the row closest to the incoming radiation is responsive to x-radiation having the relatively lowest energy and the row farthest from the incoming radiation is responsive to the x-radiation having the relatively highest energy.

In one instance, one or more intermediate rows of scintillator pixels can be used as a "filter" for energy separation. By using a row of scintillator pixels as such, the signal associated therewith can be combined with signals from other in-line and/or otherwise used such that radiation dose is not wasted, but instead used to contribute to the signal. In other words, the photo detector allows for multi-energy detection with "no loss" energy separation between scintillator layers for conventional CT. In contrast, with a spectral system configured with a filter, photons are discarded, reducing efficiency relative to the embodiment described herein.

FIGS. 5A and 5B respectively show views of the one-dimensional multi-element photo detector 120 without the scintillator array 126 respectively from the x and z-axis directions. In this example, the one-dimensional multi-element photo detector 120 is a thin rectangular sheet with a photosensitive or pixilated area 504 and a non-photosensitive or non-pixilated area 506. A suitable material of the sheet and, hence both areas 504, 506, includes, but is not limited to silicon, and a suitable thickness of the sheet is in a range from about 30 to 150 microns. Again, having both areas 504, 506 on the one-dimensional multi-element photo detector 120 may facilitate reducing overall detector array cost and footprint and increasing reliability, interconnect density, and dose efficiency. In one instance, the higher electrical interconnect density on the silicon surface allows for more rows of photodiodes in depth.

In this example, the pixilated area 504 is pixilated with M columns 508×N rows 510 of photodiode pixels and forms the M×N photodiode array 122. In the illustrated embodiment, M=32 and N=4. In other embodiments, M may vary from 1 to 256 and N may vary from 1 to 32. It is to be appreciated that the illustrated dimensions are provided for explanatory purpose and are not limiting. That is, in other embodiments, the pixilated area may include more or less row or columns of pixels. The photodiode array 122 can be formed on the one-dimensional multi-element photo detector 120 via a CMOS process or otherwise.

The dimensions of the illustrated photodiode pixels increase in thickness or depth along the y direction. In the illustrated instance, a photodiode pixel is configured with a depth that corresponds to the depth of a corresponding structured scintillator pixel, and, as discussed above, the depth of such a scintillator pixel is selected based on an energy separation of interest, a material of the pixel, etc. In other embodiments, the depth of the photodiode pixels may be otherwise selected.

In the illustrated example, the photodiode pixels are front illuminated photo (FIP) diodes. The non-pixilated area 506 includes electrically conductive electrical traces 512 that inter-connect each photodiode pixel to bonding pads and a readout area. In one instance, the traces 512 are formed on the surface of the photo detector 120. For example, where the photo detector 120 includes silicon, the traces 512 can be formed on the silicon using various silicon processing techniques. The traces 512 can also be on internal Silicon layers. The readout electronics 124 are mechanically mounted to the silicon in the non-pixilated area 506 and is electrically connected to the bonding pads via solder bumps, wire bonds and/or otherwise. Thermal expansion effects can be reduced by matching readout electronics and photo detector 120 materials (e.g., glass to silicon). The readout electronics 124 extends out from the one-dimensional multi-element photo detector 120 in the x-axis direction.

In the illustrated example, a 128 channel ASIC 124 or other readout electronics 124 would provide a channel for each of the 32×4 photodiode pixels. A 256 channel ASIC 124 would provide additional channels, which could be used for amplifying signals, converting analog signal to digital signals, routing signals, redundancy, correlated double-sampling, pulsed x-ray corrections, afterglow correction, bad pixel correction, and/or other functions. For instance, some channels of the ASIC 124 may be used for pulsed x-ray CT, which could be used to resolve time dependent sampling issues. In another instance, the ASIC can implement an algorithm that senses and/or corrects for shadowing from the anti-scatter grid 134. Of course, ASICs with other numbers of channels, including more or less, are contemplated herein.

FIG. 6 illustrates an example spectral response for the one-dimensional multi-element photo detector 120 depicted in FIGS. 2-5. In this example, the pixels include cesium iodide (CsI). As noted above, the depth of the photodiode and scintillator pixels for the illustrated one-dimensional multi-element photo detector 120 increases as a function of distance from the incoming radiation. For the curves in FIG. 6, the depths of the pixels respectively are 0.35 mm, 0.65 mm, 1.00 mm and 2.50 mm. The scanning parameters include: 120 kVp, 2.5 mm AL, 2 mm TI, 10 cm path of through water, and −9.0 mm of bone in 1.0 mm steps.

A first axis 602 represents the detector response (or the number of detections), and a second axis 604 represents photon energy in units of keV. A first set of curves 606 represents responses for the row of detector pixels corresponding to the row of scintillator pixels that is closest to the incoming radiation for 0 to 9 mm of bone in 1 mm steps. A second set of curves 608 represents responses for the next row of detector pixels for 0 to 9 mm of bone in 1 mm steps. A third set of curves 610 represents responses for the next row of detector pixels, again for 0 to 9 mm of bone in 1 mm steps. A fourth set of curves 612 represents responses for the row of detector pixels farthest from the incoming radiation for 0 to 9 mm of bone in 1 mm steps.

As shown in FIG. 6, the configuration of the one-dimensional multi-element photo detector 120 as depicted in FIGS. 2-5 allows for energy separation of the detected photons without discarding any photons. For instance, from the set of curves 606, the upper row of pixels predominantly detects lower energy photons with a mean energy values of around 60 keV. The next row of pixels, from the set of curves 608, predominantly detects photons with a mean energy values of around 70 keV. Many of these photons include higher energy photons that traverse through the upper row of pixels. The next row of pixels, from the set of curves 610, predominantly detects photons with a mean energy values of around 85 keV. Many of these photons include higher energy photons that traverse through the second row of pixels. The last row of pixels, from the set of curves 612, predominantly detects photons with a mean energy values of around 100 keV. Many of these photons include higher energy photons that traverse through the third row of pixels. As the mean energy for each row of pixels is different, the rows of pixels allow for energy separation. In addition, unlike configurations in which filters are used between rows of scintillator, the illustrated example includes a continuous scintillator, as the rows of scintillator pixels are stacked without any filter therebetween. As such, photons are not filtered out. Rather, photons that traverse one layer are detected or absorbed in a lower layer.

As briefly noted above, the anti-scatter grid 134 can be focused in one or two dimensions. FIG. 7 shows an example in which one or more of the individual grid septa or elements 702 of the anti-scatter grid 134 that extend along the z-axis direction are focused at a focal spot 704. In FIG. 8, one or more of the individual grid septa or elements 802 of the anti-scatter grid 134 that extend along the x-axis direction are focused at a focal spot 704. Focusing either or both of the anti-scatter grids 134 can improve dose efficiency and/or decrease noise, as more of the transmission (non-scattered) radiation is more likely to traverse the septa and strike the scintillator relative to a configuration in which neither anti-scatter grid 134 is focused at the focal spot 704.

Variations and/or other embodiments are discussed.

In the illustrated embodiment, the readout electronics 124 are a separate component mechanically mounted to the non-pixilated area 506 of the one-dimensional multi-element photo detector 120. In another embodiment, the readout electronics 124 can be formed as part of the non-pixilated area 506 of the one-dimensional multi-element photo detector 120 via complementary metal oxide semiconductor (CMOS) or other technology.

As discussed in connection with FIG. 2(A), in the illustrated embodiment the slice modules 118 in a detector module 116 are in substantial alignment with each other along the x-axis. In another embodiment, at least one of the slice modules 118 in the detector module 116 can be staggered, with respect to at least one of slice module 118 in the detector module 116, along the x-axis. For example, FIG. 9 shows an example in which alternate slice modules 118 are staggered or offset from each other in the z-axis direction by a half a scintillator pixel. Such an offset may increase z-axis sampling. With this configuration, the anti-scatter grid septa are likewise staggered in the z-axis direction.

In the above illustrated embodiment, the scintillator pixels in the scintillator array 126 are generally cuboid shaped. As shown in FIG. 10, in another example a columnar scintillator array 1002 is alternatively used. The columnar scintillator array 1002 includes a matrix of tubular or pipe shaped scintillator pixels 1004, which are optically coupled to the photodiode array region of the one-dimensional multi-element photo detector 120. Such scintillators may be 0.25 mm to 2.50 mm thick. Unlike the above discussed cuboid shaped scintillator pixels, the dimensions of the pixels of columnar scintillator array 1002 do not have to be structured nor aligned with high tolerances. In addition, using columnar scintillators allows for more flexibility in varying the active area of the photodiode pixels by electronic switching or otherwise.

In another embodiment, one or more intermediate scintillator layers or filters can be disposed between rows of scintillator pixels 1004 to selectively filter photons. This may improve energy separation.

As discussed above, the anti-scatter septa 702, 802 can be focused in one or two dimensions at the focal spot 704. Additionally or alternatively, the individual slice modules 118 of the detector array 114 can be focused with the focal spot 704. This is shown in connection with FIG. 11. As depicted in FIG. 11, the slice modules 118 in a range 1102 around a center region 1104 of the detector array 114 are focused at the focal spot 704 and are substantially vertical or parallel to an imaginary line 1106 extending from the focal spot 704 through the detector array 114 and perpendicularly intersecting the x-axis and the detector array 114. Slice modules 118 further away from the center region 1104 are tilted toward the imaginary line 1106 in a manner which focuses the slice modules 118 with the focal spot 704.

FIGS. 12 and 13 illustrate another embodiment in which the detector 120 is double-sided one-dimensional multi-element photo detector, having first and second multi-element photo diode arrays $122_1$, $122_2$ and corresponding first and second two-dimensional scintillator arrays $126_1$, $126_2$. In this example, the illustrated scintillator array $126_1$, $126_2$ are columnar scintillator arrays. In other embodiments, the double-sided one-dimensional multi-element photo detector 120 includes a structured or other scintillator array 126. The columnar scintillator material can be directly deposited to both sides of the photodiode area. In the illustrated embodiment, two half-thickness layers of scintillator could be used.

FIG. 13 shows multiple double-sided one-dimensional multi-element photo detectors 120 stacked together in a portion of a detector module 116. Adjacent two-dimensional scintillator arrays $126_1$, $126_2$ can be bonded together via an adhesive, and a reflective material can be applied to the sides of the scintillator arrays $126_1$, $126_2$ not facing the multi-element photo diode arrays $122_1$, $122_2$. A single or separate ASIC's 124 (not shown) can be used with each detector 120. As with the other embodiments discussed herein, the ASIC(s) can be affixed to or formed as part of the detector 120. In addition, adjacent slice modules 118 can be alternately staggered as described herein.

FIG. 14 illustrates another embodiment in which two one-dimensional multi-element photo detector $120_1$, $120_2$ share a common scintillator array 126. This may improve statistics relative to a configuration in which only one one-dimensional multi-element photo detector 120 as light is directly detected from both sides long the x-axis rather than reflecting light incident on one of these sides to the other side. As with the other embodiments described herein, two or more sets of one-dimensional multi-element photo detector $120_1$, $120_2$ sharing a common scintillator array 126 may be stacked together, staggered or not, in the detector module 116.

With this configuration, both one-dimensional multi-element photo detectors $120_1$, $120_2$ may be integrating detectors, both may be counting detectors, or one of the one-dimensional multi-element photo detectors $120_1$, $120_2$ may be an integrating detector while the other is a counting detector. In the latter case, the system 100 may be configured to operate in either integration or counting mode. In one instance, the scan protocol may determine the particular mode. In another instance, the mode at any moment in time may be a function of the x-ray flux, and may alternate between modes if the x-ray flux changes.

FIG. 13 above describes a double-sided one-dimensional multi-element photo detector 120. FIGS. 15, 16 and 17 illustrate various non-limiting embodiments of the double-sided one-dimensional multi-element photo detector 120. Although the embodiments shown in FIGS. 15, 16 and 17 include structured scintillators, it is to be understood that a columnar scintillator can alternatively be used as described herein. In addition, the number of illustrated photosensitive rows and/or columns is provided for explanatory purposes and is not limiting, as described herein.

In FIG. 15, the double-sided one-dimensional multi-element photo detector 120 includes two single-sided one-dimensional multi-element photo detectors $120_1$ and $120_2$, butted together back to back. The detector $120_1$ includes the photosensitive area $504_1$ and the non-photosensitive area $506_1$. The photosensitive area $504_1$ includes the multi-element photodiode array $122_1$, and the non-photosensitive area $506_1$ includes the readout electronics $124_1$. The two-dimensional scintillator array $126_1$ is optically coupled to the photodiode array $122_1$. The detector $120_2$ is similarly structured.

As noted herein, the detectors $120_1$ and $120_2$ can be silicon based. In one instance, silicon-based detectors $120_1$ and $120_2$ are coupled through silicon-to-silicon covalent bonding. This may include butting the back sides of the detectors $120_1$ and $120_2$ and suitably heating the detectors $120_1$ and $120_2$ so that silicon-to-silicon covalent bonds forms between the detectors $120_1$ and $120_2$. In another embodiment, a bonding agent such as an epoxy is used to couple the detectors $120_1$ and $120_2$. In yet another embodiment, the detectors $120_1$ and $120_2$ may respectively include complementary features (e.g., protrusions and corresponding recesses) that facilitate coupling the detectors $120_1$ and $120_2$ together. In still another embodiment, the detectors $120_1$ and $120_2$ lie back to back without any additional securing mechanisms.

The illustrated embodiment also includes interconnects or input/output (I/O) contacts $1502_1$ and $1502_2$. A conductive trace(s) (not visible) formed on the photo detectors $120_1$ and $120_2$ routes data from the readout electronics $124_1$ and $124_2$ off the detectors $120_1$ and $120_2$, and/or from off the detectors $120_1$ and $120_2$ to the readout electronics $124_1$ and $124_2$. The contacts 1502 may be coated with copper and also facilitate dissipating heat. The conductive trace(s) can be silicon based and formed in the silicon of the detectors $120_1$ and $120_2$. As noted above, the readout electronics $124_1$ and $124_2$ can also be silicon based, which allows for matching the coefficient of thermal expansion of the detectors $120_1$ and $120_2$ and the readout electronics $124_1$ and $124_2$, which can mitigate thermal expansion effects between materials having different coefficient of thermal expansion. As described in greater detail below, at least a portion of the detectors $120_1$ and $120_2$ can be encapsulated with an encapsulant 1504.

In FIG. 16, the double-sided one-dimensional multi-element photo detector 120 includes a single substrate 1600 with the photosensitive areas $504_1$ and $504_2$ and the non-photosensitive areas $506_1$ and $506_2$ on both sides as described above in connection with FIG. 15. Likewise, the detector 120 includes the multi-element photodiode arrays $122_1$ and $122_2$ respectively within the photosensitive areas $504_1$ and $504_2$, and the scintillator arrays $126_1$ and $126_2$ are respectively optically coupled to the photodiode arrays $122_1$ and $122_2$. The readout electronics $124_1$ and $124_2$ are located respectively within the non-photosensitive areas $506_1$ and $506_2$. Note that in this embodiment each side of the detector 120 includes corresponding readout electronics $124_1$ or $124_2$. The I/O contacts $1502_1$ and $1502_2$ route data to and/or from the readout electronics $124_1$ and $124_2$.

The detector 120 in FIG. 17 is substantially similar to the detector 120 in FIG. 16. One difference is that in FIG. 17 the detector 120 is configured with common, shared readout electronics 124. Another difference is that the detector 120 includes one or more thru-hole silicon vias 1702 for routing signals from the photodiode array 122₁ on one side of the detector 120 to the readout electronics 124, which are coupled to the other side of the detector 120. Of course, signals from the photodiode arrays 122₂ located on the same side as the readout electronics 124 are also routed to the readout electronics 124. Analog switches can be used to selectively electrically connect photodiode layers to the readout electronics inputs.

In FIGS. 15-17, a conductive trace(s) formed in the detector substrate 120 routes signals between the readout electronics 124 and the I/O contact(s) 1502. In FIG. 18, the I/O contact(s) 1502 is directly coupled to the readout electronics 124 through a solder, conductive epoxy or the like.

Figure 19:
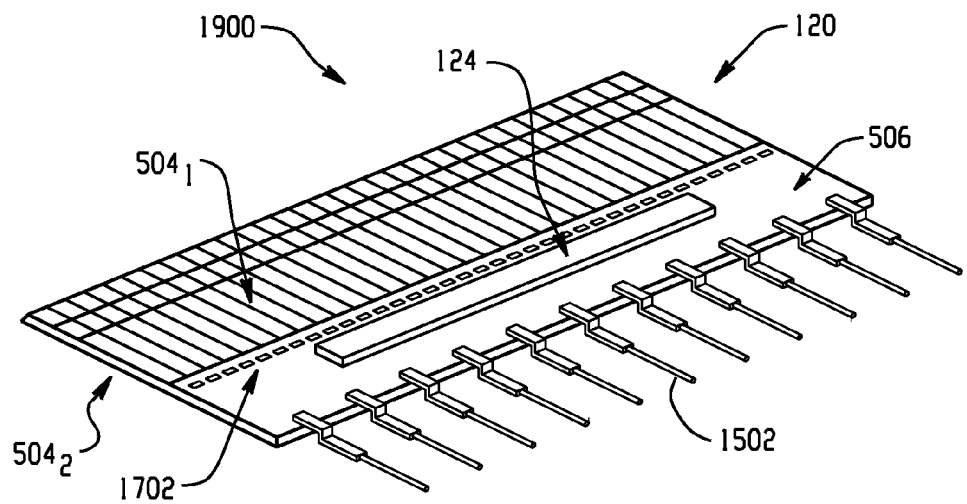

FIGS. 19, 20, 21 and 22 illustrate a non-limiting example method for assembling a double-sided single ASIC one-dimensional multi-element photo detector 120. Initially referring to FIG. 19, at 1900 the readout electronics 124 and the I/O conductive contacts 1502 are affixed to the detector 120, and the conductive vias 1702 are formed on the detector 120. In the illustrated embodiments, the readout electronics 124 are soldered to the non-photosensitive area 506. Likewise, the I/O conductive contacts 1502, which, in the illustrated embodiment, include a plurality of single in-line packaged (SIP) pins, are soldered to conductive pads on the detector 120. FIG. 19 also shows photosensitive areas 504₁ and 504₂.

Figure 20:
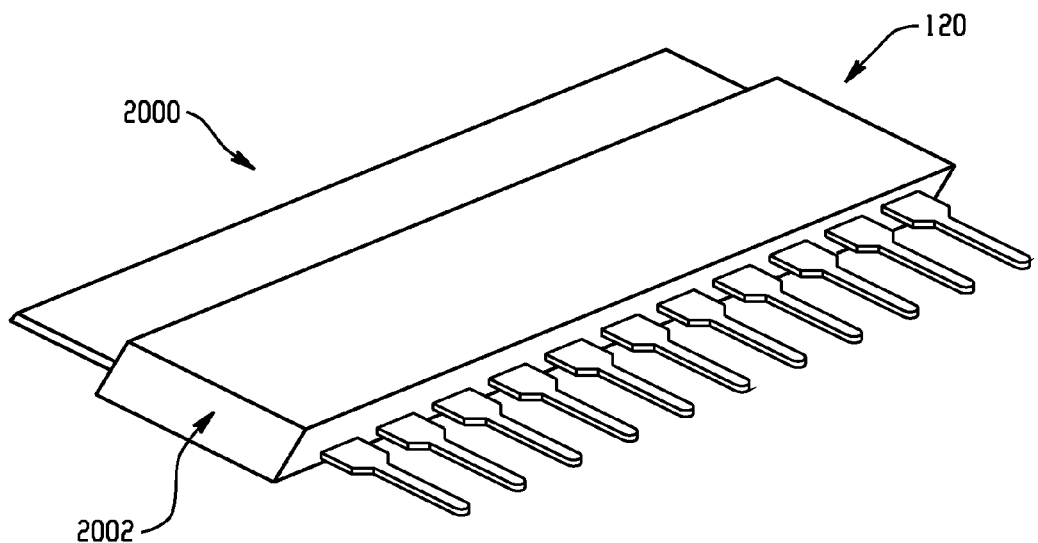
Figure 21:
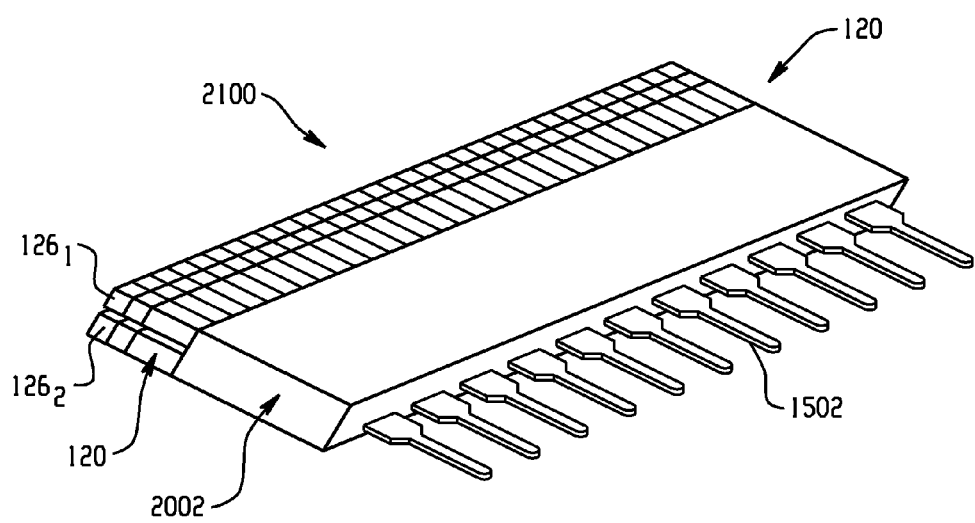

Turning to FIG. 20, at 2000 a sub-portion of the detector 120 is potted. This includes encapsulating the non-photosensitive area 506, including the vias 1702, the readout electronics 124, and regions of the I/O 1502 that affixed to the detector 120 with an encapsulant such as a non-conductive encapsulant 2002, for example, a plastic or the like. Prior to potting the detector 120, the detector 120 could first be tested. In FIG. 21, at 2100, the scintillator arrays 126₁ and 126₂ are affixed to the multi-element photodiode arrays 122₁ and 122₂. A reflective coating can be applied over the scintillator arrays 126₁ and 126₂. In an alternative embodiment, the reflective coating can also be used as the encapsulant. In this embodiment, the reflective coating and encapsulant can be simultaneously or individually applied.

Figure 22:
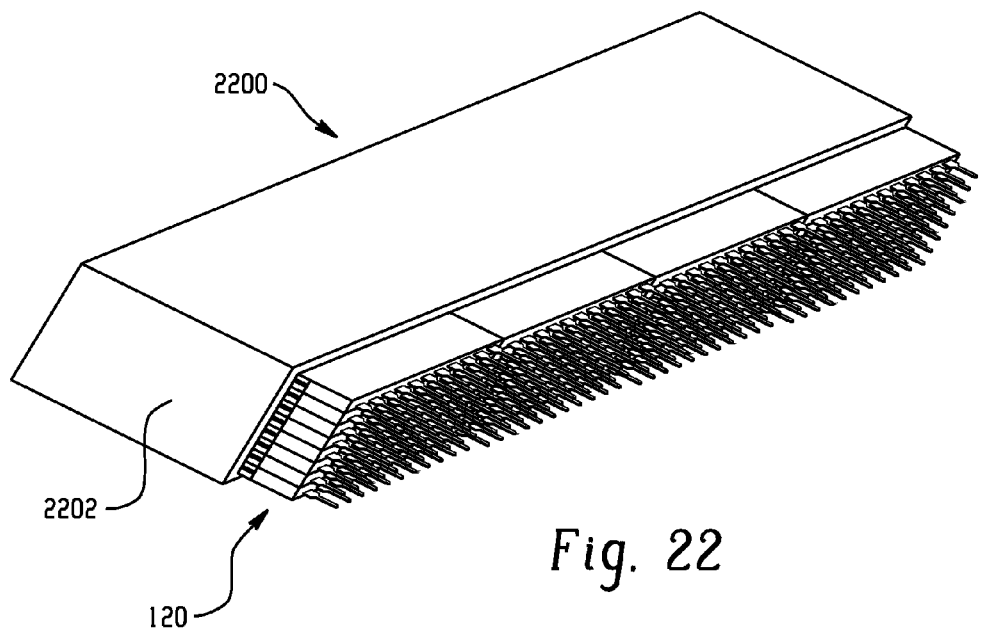

In FIG. 22, at 2200, the photo detector 120 is affixed to a two (2) dimensional focused antiscatter grid (ASG) 2202. In the illustrated embodiments, a plurality of the photo detectors 120 affixed to a single block focused 2D ASG 2202. As described herein, this may include assembling a plurality of the detectors 120 into sub-modules, and assembling a plurality of the sub-modules into modules that are aligned with the ASG 2202. In one instance, an alignment plate is used to align the photo detectors 120 and the ASG 2202. FIGS. 23 and 24 show an example alignment plate 2300. In the illustrated embodiment, the plate 2300 is a carbon fiber sheet. In other embodiments, the plate 2300 may include other materials.

FIG. 23 shows a first side 2302 of the plate 2300, which aligns the ASG 2202. In this illustrated embodiment, the first side 2302 includes one or more alignment fiducials or features 2304, which can be embossed, machined or otherwise formed on a surface of the plate 2300. In one instance, the features are formed from a low density, low "Z" material 2306. Note that only a portion of the ASG needs to fit in the features. FIG. 24 shows a second side 2402 of the plate 2300, which aligns the detectors 120. In this illustrated embodiment, the second side 2402 includes one or more fiducials or protruding alignment features 2404, which can be deposited or built up to fit mating slots or other features on the detector 120.

FIGS. 25 and 26 respectively show non-limiting embodiments of the photo detector 120 mounted to a printed circuit board (PCB) 2500. In FIG. 25, the I/O conductive contacts 1502 are mounted to the PCB 2500 through solder joints 2502. For improved heat transfer, the contacts 1502 can be plated with copper. The solder joints holding the contacts 1502 to the readout electronics 124 generally conducts heat better than a thermal epoxy. In FIG. 26, the contacts 1502 routing data from and/or to the readout electronics 124 is soldered to an etched copper sheet 2600, which is affixed to a heat sink 2602.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

What is claimed is:

1. A one-dimensional multi-element photo detector, comprising:
   a photodiode array, including a first upper row of photodiode pixels and a second lower row of photodiode pixels, wherein the photodiode array is part of and not a separate physical component mounted to the photo detector;
   a scintillator array, including a first upper row and a second lower row of scintillator pixels, wherein the first upper and second lower rows of scintillator pixels are respectively optically coupled to the first upper and second lower rows of photodiode pixels;
   readout electronics, wherein the readout electronics are part of the photo detector wherein and the readout electronics are not a separate physical component mounted to the photo detector, and
   electrical traces that interconnect the photodiode pixels and the readout electronics,
   wherein the photo detector is double sided, and the double-sided photo detector comprises two one-dimensional multi-element photo detectors coupled back to back.

2. The photo detector of claim 1, wherein the photo detector includes both a photosensitive area and a non-photosensitive area, and wherein the photodiode array is part of the photosensitive area and the readout electronics are part of the non-photosensitive area.

3. The photo detector of claim 2, wherein the photosensitive area and the non-photosensitive area are different areas of a same silicon substrate of the photo detector.

4. The photo detector of claim 3, wherein the non-photosensitive area corresponds to an extended region of the silicon substrate.

5. The photo detector of claim 3, wherein the different areas are on a same side of the same silicon substrate of the photo detector.

6. The photo detector of claim 5, further including: a second photodiode array; a second scintillator array; second readout electronics; and second electrical traces, wherein the scintillator array and the second scintillator array are the same second scintillator array.

7. The photo detector of claim 1, wherein the scintillator array includes a plurality of structured scintillator pixels.

8. The photo detector of claim 1, wherein the scintillator array includes a matrix of columnar scintillator pixels.

9. The photo detector of claim 8, wherein the columnar scintillator pixels are non-structured tubular shaped scintillator pixels.

10. The photo detector of claim 1, further including at least one intermediate row of scintillator pixels, which is disposed between the first upper and the second rows lower rows of scintillator pixels, wherein the intermediate row of scintillator pixels is used as a filter for energy separation.

11. The photo detector of claim 10, further including at least one intermediate row of photodiode pixels optically coupled to the at least one intermediate row of scintillator pixels.

12. The photo detector of claim 11, wherein a signal from the at least one intermediate row of photodiode pixels is combined with signals from the other rows of scintillator pixels.

13. The photo detector of claim 1, wherein the two one-dimensional multi-element photo detectors are coupled through a silicon-to-silicon covalent bond.

14. The photo detector of claim 1, wherein the double-sided photo detector comprises a single photo detector with first and second opposing sides and a photosensitive area and a non-photosensitive area on each of the sides.

15. The photo detector of claim 1, wherein the photo detector is coupled to a two-dimensional antiscatter grid.

16. The photo detector of claim 1, wherein the photo detector is installed in a slice module of a detector module along with a plurality of other photo detectors.

17. A detector module, comprising:
a plurality of slice modules, each slice module including:
a plurality of support structures; and
a plurality of one-dimensional multi-element photo detectors, each one-dimensional multi-element photo detector, including:
a silicon substrate, including:
a readout area with readout electronics; and
a photosensitive area with a photo diode array having a plurality of stacked rows of photodiode pixels, wherein the photosensitive area and the readout area are different areas of a same side of the same silicon substrate of the photo detector and the photosensitive area and the readout electronics are not mounted to the silicon substrate, wherein a scintillator array is optically coupled to the photo diode array;
wherein each of the plurality of support structures supports a corresponding one of the one-dimensional multi-element photo detectors,
wherein at least one of the plurality of one-dimensional multi-element photo detectors is double sided, and the double-sided photo detector comprises a single photo detector with first and second opposing sides and a photosensitive area on each of the sides.

18. The detector module of claim 17, wherein the plurality of one-dimensional multi-element photo detectors are aligned in parallel.

19. The detector module of claim 17, wherein alternate ones of the plurality of one-dimensional multi-element photo detectors are staggered with respect to each other.

20. The detector module of claim 17, wherein a one-dimensional multi-element photo detector affixes to a backside of the support structure.

21. The detector module of claim 17, wherein the readout electronics are physically mounted to readout area.

22. The detector module of claim 17, wherein the readout electronics are part of the readout area.

23. The detector module of claim 17, wherein the double-sided photo detector comprises two one-dimensional multi-element photo detectors coupled back to back.

24. The detector module of claim 17, wherein the single photo detector comprises a non-photosensitive area on each of the sides.

25. The detector module of claim 24, wherein the double-sided photo detector shares the same readout electronics.

26. The detector module of claim 24, wherein each side of the double-sided photo detector includes corresponding readout electronics.

27. The detector module of claim 17, wherein the photo detector is configured for spectral imaging.

28. An imaging system, comprising:
a source that emits radiation from a focal spot; and
that detects the radiation and generates a signal indicative thereof, the detector array, including a plurality of slice modules stacked along a transverse axis and extending along a longitudinal axis, each slice module, including:
a plurality of one-dimensional multi-element photo detectors aligned in series, each one-dimensional multi-element photo detector, including:
readout electronics;
a photo diode array with at least a first upper row and a second lower row of photodiode pixels, wherein the photodiode pixels and the readout electronics are different areas of a same side of the same silicon substrate of the photo detector and are not mounted to the silicon substrate; and
a scintillator array with at least a first upper row and a second lower row of scintillator pixels, wherein the first upper and second lower rows of scintillator pixels are respectively optically coupled to the first upper and second lower rows of photodiode pixels; and
a plurality of support structures, each support structure supporting a corresponding one of the photo detectors,
wherein at least one of the one-dimensional multi-element photo detectors is double sided, and the double-sided photo detector comprises a single photo detector with first and second opposing sides and a photosensitive area and a non-photosensitive area on each of the sides.

29. The imaging system of claim 28, wherein the slice modules are focused with the focal spot.

30. The imaging system of claim 28, further including an anti-scatted grid affixed to the detector array, wherein the anti-scatter grid includes septa that are focused with the focal spot.

31. The imaging system of claim 30, wherein the septa are focused along the transverse axis.

32. The imaging system of claim 30, wherein the septa are focused along the longitudinal axis.

33. The imaging system of claim 28, wherein the double-sided photo detector comprises two one-dimensional multi-element photo detectors coupled back to back.

34. The imaging system of claim 28, wherein the plurality of detectors are coupled to a two-dimensional antiscatter grid.

35. The imaging system of claim 34, wherein the plurality of detectors are coupled to the two dimensional antiscatter grid using an alignment plate.

36. The imaging system of claim 35, wherein the alignment plate includes a first side with at least one feature for aligning the two dimensional antiscatter grid and an opposing second side with at least one feature for aligning the detectors.

* * * * *